(12) United States Patent
Onodera et al.

(10) Patent No.: US 9,966,201 B2
(45) Date of Patent: May 8, 2018

(54) ELECTROCHEMICAL CELL

(71) Applicant: SEIKO INSTRUMENTS INC., Chiba (JP)

(72) Inventors: Hideharu Onodera, Sendai (JP); Shunji Watanabe, Sendai (JP); Masaya Kon, Sendai (JP)

(73) Assignee: SEIKO INSTRUMENTS INC., Chiba (JP)

( * ) Notice: Subject to any disclaimer, the term of this patent is extended or adjusted under 35 U.S.C. 154(b) by 239 days.

(21) Appl. No.: 14/092,369

(22) Filed: Nov. 27, 2013

(65) Prior Publication Data
US 2014/0087244 A1 Mar. 27, 2014

Related U.S. Application Data

(60) Continuation of application No. 13/419,196, filed on Mar. 13, 2012, now Pat. No. 8,617,740, which is a
(Continued)

(30) Foreign Application Priority Data

Jul. 29, 2005 (JP) .................. 2005-221391

(51) Int. Cl.
*H01G 11/86* (2013.01)
*H01G 11/74* (2013.01)
(Continued)

(52) U.S. Cl.
CPC ............. *H01G 11/86* (2013.01); *H01G 9/016* (2013.01); *H01G 9/08* (2013.01); *H01G 9/10* (2013.01);
(Continued)

(58) Field of Classification Search
CPC ........ H01M 2/0207; H01M 2/30; H01M 2/02; H01M 2/0237; H01M 2/32; H01M 2/26;
(Continued)

(56) References Cited

U.S. PATENT DOCUMENTS 4,118,553 A 10/1978 Buckethal et al.
4,331,743 A 5/1982 Dey
(Continued)

FOREIGN PATENT DOCUMENTS

DE 19851571 A1 5/1999
EP 1553649 A2 7/2005
(Continued)

OTHER PUBLICATIONS

Office Action for corresponding Korean Patent Application No. 10-2007-7021401 dated Mar. 12, 2009.
(Continued)

*Primary Examiner* — Eugenia Wang
(74) *Attorney, Agent, or Firm* — Seager, Tufte & Wickhem LLP

(57) ABSTRACT

In an electrochemical cell including a cathode 7, an anode 6, electrolyte 10, a hollow container 1 accommodating these members, and terminals extending from the inside to the outside of the hollow container 1, the terminals include a plurality of inner terminals 5a formed on the inner surface of the hollow container 1, a cathode outer terminal 5b1 formed on the outer surface of the hollow container 1, and an inner layer wire 5c formed on the inner layer of the hollow container 1 for commonly connecting the plurality of inner terminals 5a to the cathode outer terminal 5b1.

9 Claims, 5 Drawing Sheets

Related U.S. Application Data division of application No. 11/817,169, filed as application No. PCT/JP2006/311399 on Jun. 7, 2006, now Pat. No. 8,563,166.

(51) Int. Cl.

| | | |
|---|---|---|
| *H01G 11/82* | (2013.01) | |
| *H01M 10/05* | (2010.01) | |
| *H01M 10/42* | (2006.01) | |
| *H01G 9/008* | (2006.01) | |
| *H01G 9/08* | (2006.01) | |
| *H01G 9/10* | (2006.01) | |
| *H01G 9/14* | (2006.01) | |
| *H01M 2/32* | (2006.01) | |
| *H01M 2/02* | (2006.01) | |
| *H01M 2/06* | (2006.01) | |
| *H01M 2/30* | (2006.01) | |
| *H01M 2/34* | (2006.01) | |
| *H01M 2/26* | (2006.01) | |
| *H01G 11/08* | (2013.01) | |
| *H01G 11/80* | (2013.01) | |

(52) U.S. Cl.
CPC .............. *H01G 9/14* (2013.01); *H01G 11/74* (2013.01); *H01G 11/82* (2013.01); *H01M 2/02* (2013.01); *H01M 2/0202* (2013.01); *H01M 2/0207* (2013.01); *H01M 2/0222* (2013.01); *H01M 2/0237* (2013.01); *H01M 2/06* (2013.01); *H01M 2/26* (2013.01); *H01M 2/30* (2013.01); *H01M 2/32* (2013.01); *H01M 2/34* (2013.01); *H01M 10/05* (2013.01); *H01M 10/425* (2013.01); *H01G 11/08* (2013.01); *H01G 11/80* (2013.01); *Y02E 60/13* (2013.01)

(58) Field of Classification Search
CPC ........ H01M 2/34; H01M 2/0202; H01M 2/06; H01M 10/425; H01M 10/05; H01M 10/42; H01M 2/0222; H01G 9/016; H01G 9/10; H01G 9/14; H01G 9/08; H01G 11/74; H01G 9/008; H01G 11/86; H01G 11/08; H01G 11/80; H01G 11/82
See application file for complete search history.

(56) References Cited

U.S. PATENT DOCUMENTS

| | | | |
|---|---|---|---|
| 4,916,576 | A | 4/1990 | Herbert |
| 5,464,706 | A | 11/1995 | Dasgupta et al. |
| 5,476,734 | A | 12/1995 | Pulley et al. |
| 5,670,278 | A | 9/1997 | Disselbeck |
| 6,201,686 | B1 | 3/2001 | Hiratsuka et al. |
| 6,445,566 | B2 | 9/2002 | Watanabe et al. |
| 6,529,365 | B1 | 3/2003 | Liu et al. |
| 6,567,261 | B2 | 5/2003 | Kanouda et al. |
| 6,580,597 | B2 | 6/2003 | Kanouda et al. |
| 6,808,845 | B1 | 10/2004 | Nonaka et al. |
| 7,311,995 | B2 | 12/2007 | Nakamura et al. |
| 7,521,153 | B2 | 4/2009 | Li et al. |
| 7,541,111 | B2 | 6/2009 | Itoh et al. |
| 7,651,813 | B2 | 1/2010 | Yokoi et al. |
| 7,749,649 | B2 | 7/2010 | Watanabe et al. |
| 8,563,166 | B2 | 10/2013 | Onodera et al. |
| 2001/0012193 | A1 | 8/2001 | Watanabe et al. |
| 2001/0014076 | A1 | 8/2001 | Yamanaka |
| 2002/0150822 | A1 | 10/2002 | Marlow et al. |
| 2003/0039092 | A1 | 2/2003 | Kanouda et al. |
| 2003/0042878 | A1 | 3/2003 | Kanouda et al. |
| 2004/0157121 | A1 | 8/2004 | Watanabe et al. |
| 2004/0185330 | A1 | 9/2004 | Yamaguchi et al. |
| 2004/0241542 | A1 | 12/2004 | Nakamura et al. |
| 2005/0037258 | A1 | 2/2005 | Itoh et al. |
| 2005/0158628 | A1 | 7/2005 | Watanabe et al. |
| 2006/0019168 | A1 | 1/2006 | Li et al. |
| 2006/0099510 | A1 | 5/2006 | Naarmann et al. |
| 2007/0014076 | A1 | 1/2007 | Omura et al. |
| 2012/0171558 | A1 | 7/2012 | Onodera et al. |

FOREIGN PATENT DOCUMENTS

| | | |
|---|---|---|
| JP | 59176136 U | 11/1984 |
| JP | 05347233 | 12/1993 |
| JP | 11345604 A | 12/1999 |
| JP | 20011216952 A | 8/2001 |
| JP | 2002313678 A | 10/2002 |
| JP | 2003070235 A | 3/2003 |
| JP | 2004227959 A | 8/2004 |
| JP | 2004356009 | 12/2004 |
| JP | 2004356462 A | 12/2004 |
| JP | 2005093833 A | 4/2005 |
| JP | 2005158700 A | 6/2005 |
| JP | 2005183373 | 7/2005 |
| JP | 2006128089 A | 5/2006 |
| WO | 2004008561 A1 | 1/2004 |

OTHER PUBLICATIONS

German Patent Application No. 11 2006 004 269.6 Office Action dated Feb. 19, 2016, 6 pages.
English Translation of German Patent Application No. 11 2006 004 269.6 Office Action dated Feb. 19, 2016, 4 pages.
Korvar Alloy Technical Datasheet; Carpenter; May 16, 2016; http://chartech.ides.com/datasheet.aspx?i=101&e=173&c=TechArt&FMT=PRINT.

ELECTROCHEMICAL CELL

RELATED APPLICATIONS

This application is a continuation application of U.S. application Ser. No. 13/419,196 filed Mar. 13, 2013, which is a divisional application of U.S. application Ser. No. 11/817,169 filed Aug. 27, 2007.

TECHNICAL FIELD

The present invention relates to a surface attachable electrochemical cell.

BACKGROUND ART

A surface attachable electrochemical cell (electric double layer capacitor and battery) is used in a backup power supply for a clock function, a backup power supply for a semiconductor memory, and the like. In such compact electrochemical cells, the need for larger capacitance and larger current is reducing as progress is being made in the non-volatilization of semiconductor memories and the lowering of the power consumed by clock function elements. However, demands for resistance to reflow soldering, reduction in the attachment area, and the like are increasing due to environmental concerns and miniaturization of the attached devices.

When attaching an electrochemical cell, solder cream etc. is applied in advance to the portion of a print substrate that is to undergo soldering. The electrochemical cell is attached on this portion. Alternatively, a small solder ball (solder bump) is applied to the portion that is to undergo soldering after the electrochemical cell is attached on the print substrate. The print substrate on which the electrochemical cell is attached is then conveyed through a furnace having an atmosphere set at a high temperature so that the soldering portion becomes higher than or equal to the solder melting point (e.g., 200.degree. C. to 260.degree. C.). This melts the solder and solders the electrochemical cell. Thus, it is strongly required that the electrochemical cell have heat resistance and mechanical resistance relative to reflow soldering.

Further, in the prior art, an electrochemical cell includes a case with a round form like a coin or a button. In such an electrochemical cell, terminals and the like must be welded to the outer surface of the case in advance. Furthermore, space for the terminals must be provided on the print substrate. Therefore, miniaturization of attachment devices has resulted in a strong demand for reduction in the attachment area for the electrochemical cell.

The electrochemical cell of patent document 1 uses a hollow ceramic container (hereinafter referred to as hollow container) as the case, and electrodes and electrolyte are accommodated in the hollow portion (accommodation compartment) to answer the demand for heat resistance and reduction. A metal film arranged on the outer bottom surface of the hollow container is used as a terminal.

The terminals of patent document 1 include an inner terminal formed in the hollow portion and outer terminals formed on the outer surface of the hollow container, and the cathode arranged in the hollow portion and the outer terminals are electrically connected. Such terminals are formed in the following manner using a plate-shaped ceramic green sheet and a frame-shaped ceramic green sheet that configure the hollow container. Pattern printing with a material that is mainly based on tungsten or molybdenum having a high melting point is performed on the upper surface of the plate shaped ceramic green sheet. The frame-shaped ceramic green sheet is laminated on the plate shaped ceramic green sheet having the pattern, and the two sheets are sintered together at approximately 1500.degree. C. The inner terminals and the outer terminals are both formed as a result.

However, the material forming the terminals is corroded by charge or discharge current when contacting electrolyte such as a liquid. As the corrosion proceeds, wire breakage may ultimately occur and hinder functioning.

Such problem is considered to be avoidable by relying on protection provided by a protective film formed on inner terminals to protect the inner terminals from electrolyte. The protective film uses materials mainly based on aluminum or carbon and causing less corrosion and is formed through any method of vapor deposition, sputtering, thermal spraying, injection, paste application, and the like. However, microscopic pin holes may form since the film is obtained by depositing particles in each of these methods. As a result, if the protective film does not have pin holes, satisfactory property would be realized over a long period of time. However, if the protective film has pin holes, electrolyte may gradually permeate into the protective film and ultimately corrode the inner terminals thereby causing wire breakage in the terminals. The production of pin holes may be reduced by increasing the film thickness of the protective film. However, this would increase the time required for film formation and cause the electrochemical cell to be expensive. Furthermore, the thickness of the electrode must be reduced by an amount corresponding to the thickness of the protective film. This would reduce the capacitance of the electrochemical cell.

Patent Document 1: Japanese Laid-Open Patent Publication No. 2001-216952.

DISCLOSURE OF THE INVENTION

It is an object of the present invention to solve the above problems and to provide an electrochemical cell having high reliability and high capacitance.

To achieve the above object, the present invention provides an electrochemical cell having a hollow container including an accommodation compartment for accommodating a pair of electrodes and electrolyte and terminals including a plurality of inner terminals commonly connected to one of the pair of electrodes and extending through the hollow container.

In the above electrochemical cell, the terminals include a common outer terminal formed on the outer surface of the hollow container and a plurality of wires for commonly connecting the inner terminals to the common outer terminal outside the accommodation compartment.

In the above electrochemical cell, the hollow container is a lamination in which a plurality of substrates are laminated. The wires include via wires extending from an inner layer of the hollow container to the bottom surface of the accommodation compartment. The inner terminals are end surfaces of the via wires exposed from the bottom surface.

In the above electrochemical cell, the inner terminals are made of at least one selected from the group consisting of tungsten, molybdenum, nickel, gold, and a composite of these materials and are formed by a single layer or a plurality of layers.

In the above electrochemical cell, the inner terminals are made of an electrically conductive material mainly based on carbon.

In the above electrochemical cell, the hollow container is made of ceramic containing at least one selected from the group consisting of alumina, silicon nitride, zirconium, silicon carbide, aluminum nitride, mullite, and a composite of these materials.

BEST MODE FOR CARRYING OUT THE INVENTION

First Embodiment

Figure 1:
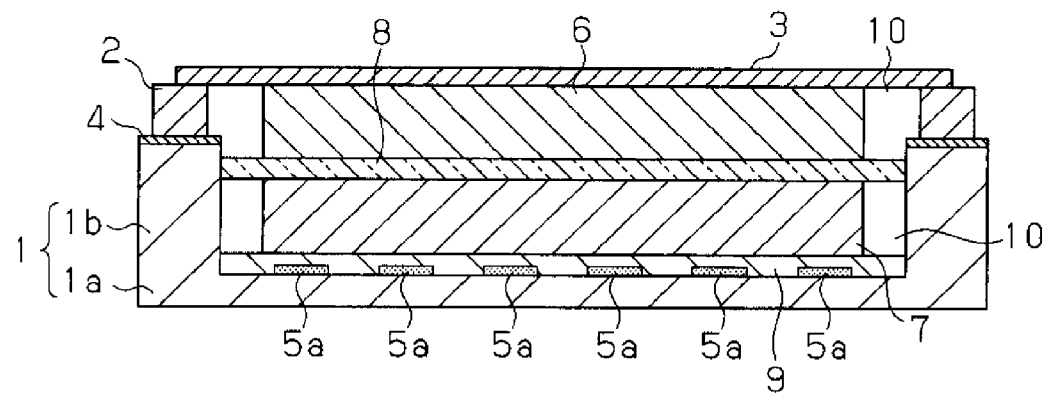
FIG. 1 is a cross-sectional view of an electrochemical cell according to a first embodiment of the present invention.
Figure 2:
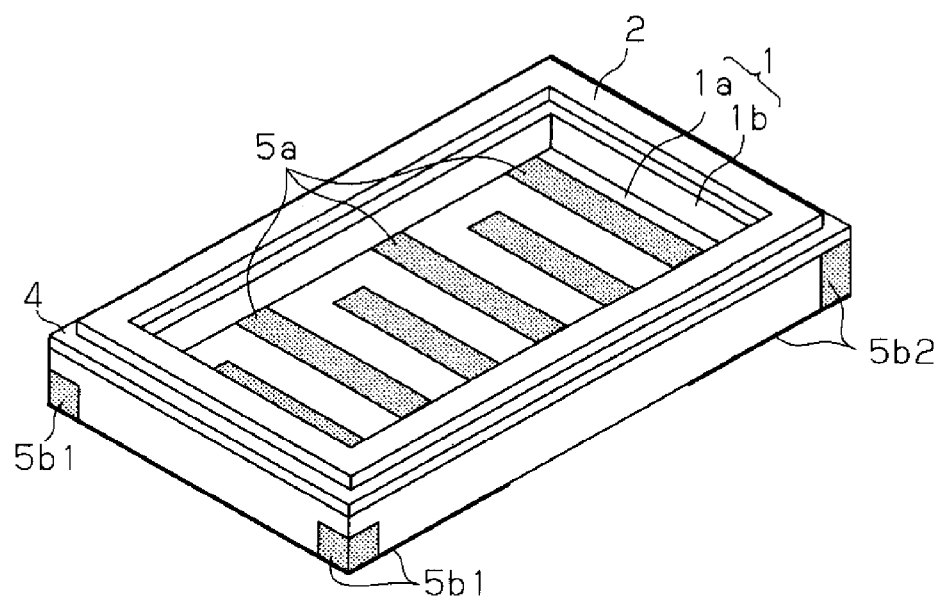
FIG. 2 is a perspective view showing a hollow container in the first embodiment of the present invention.
Figure 3:
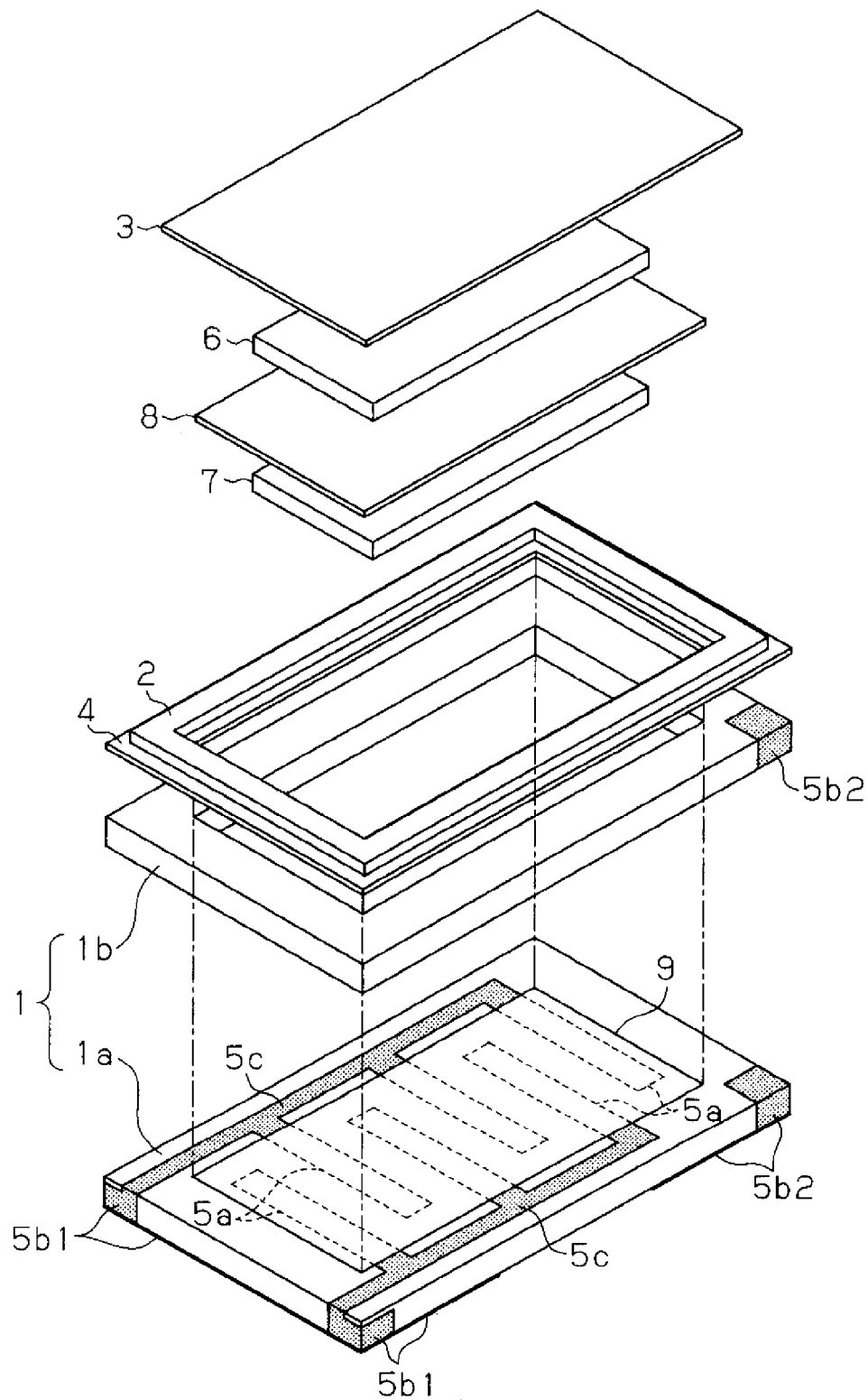
FIG. 3 is an exploded view showing the electrochemical cell in the first embodiment of the present invention.

An electrochemical cell (electric double layer capacitor and battery) according to a first embodiment of the present invention will now be described according to FIGS. 1 to 4. FIG. 1 is a cross-sectional view of the electrochemical cell, FIG. 2 is a perspective view of a hollow container that forms the electrochemical cell, and FIG. 3 is an exploded view of the electrochemical cell.

As shown in FIG. 1, the electrochemical cell includes a hollow container 1. As shown in FIG. 2, the hollow container 1 is a box-shaped ceramic container having an open upper side and including a rectangular plate-shaped bottom portion 1a and a rectangular frame-shaped wall portion 1b formed along the periphery of the bottom portion 1a. Ceramic containing at least one selected from the group consisting of alumina, silicon nitride, zirconium, silicon carbide, aluminum nitride, mullite, and a composite of these materials is used for the hollow container 1. Heat resistance material such as glass and glass ceramic may also be used for the hollow container 1. The hollow container 1 made of such material has superior heat resistance with respect to reflow soldering and enhances the hermetical seal of the hollow portion (accommodation compartment) in a sealed state. In FIG. 3, the hollow container 1 is a lamination formed by laminating ceramic green sheets in correspondence with the bottom portion 1a and ceramic green sheets in correspondence with the wall portion 1b and then sintering the sheets together.

As shown in FIG. 1, a rectangular frame-shaped seal ring 2 is bonded to the open portion of the hollow container 1. Kovar etc. having a thermal expansion coefficient close to the thermal expansion coefficient of ceramic is used for the seal ring 2. The seal ring 2 is bonded to the hollow container 1 by a brazing material such as Ag—Cu alloy and Au—Cu alloy.

A rectangular plate-shaped lid 3 is joined to the upper side of the seal ring 2. Alloy such as Kovar or 42 alloy having a thermal expansion coefficient close to the thermal expansion coefficient of ceramic and subjected to nickel plating is used for the lid 3. The lid 3 made of such material is welded to the seal ring 2 by performing resistance seam welding, laser seam welding, electron beam welding, or the like. This improves the hermetical seal of the hollow portion in a sealed state.

A cathode 7, a separator 8, and an anode 6 are laminated from the bottom surface in the hollow portion (accommodation compartment) of the hollow container 1, and the hollow portion is filled with electrolyte 10.

When using the electrochemical cell as an electric double layer capacitor, activated carbon powder, which is obtained by performing an activation treatment on sawdust, palm shell, pitch, etc., that is press molded or mill rolled with an appropriate binder may be used for the anode 6 and the cathode 7. Alternatively, phenol, rayon, acrylic, pitch fibers or the like may be formed into activated carbon or activated carbon fibers by performing non-soluble and carbon activating treatment for usage in the form of felt, fiber, paper, or a sintered body. Polyaniline (PAN) or polyacene may also be used.

When using the electrochemical cell as a battery, known active substances such as carbon, a lithium alloy including lithium-aluminum, silicon, or silicon oxide mixed with an appropriate binder and graphite, which is a conductive auxiliary agent, may be used for the anode 6.

When using the electrochemical cell as a battery, known active substances such as a manganese oxide containing lithium, a cobalt oxide containing lithium, a nickel oxide containing lithium, a titanium oxide containing lithium, molybdenum trioxide, niobium pentaoxide mixed with an appropriate binder and graphite, which is a conductive auxiliary agent, may be used for the cathode 7.

An insulative film having a large ion transmissivity and provided with mechanical strength is used for the separator 8. Glass fiber having superior thermal and mechanical resistance may be used for the separator 8 when taking into account attachment in the reflow furnace and the adverse thermal effect of the welding of the lid 3. However, resin such as polyphenylene sulfide, polyamide, polyimide, polytetrafluoroethylene, or the like may also be used.

The electrolyte 10 is preferably in the form of a liquid or a gel used in known electric double layer capacitors and non-aqueous electrolyte secondary battery.

Liquid and gel electrolyte 10 uses an organic solvent including acetonitrile, diethyl ether, diethyl carbonate, dimethyl carbonate, 1,2-dimethoxyethane, tetrahydrofuran, propylene carbonate (PC), ethylene carbonate (EC), .gamma.-butyrolactone (.gamma.BL), and the like.

The materials contained in liquid and gel electrolyte 10 include $(C_2H_5)_4PBF_4$, $(C_3H_7)_4PBF_4$, $(CH_3)(C_2H_5)_3NBF_4$, $(C_2H_5)_4NBF_4$, $(C_2H_5)_4PPF_6$, $(C_2H_5)_4PCF_3SO_4$, $(C_2H_5)_4NPF_6$, lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluorometasulfonate ($LiCF_3SO_3$), bistrifluoromethylsulfonyl imide lithium [$LiN(CF_3SO_2)_2$], thiocyan salt, aluminum fluoride salt, lithium salt, and the like but are not limited to these material. The gel electrolyte includes material obtained by immersing polymer gel in liquid. Appropriate polymer gels include polyethylene oxide, polymethylmethacrylate or polyvinylidene fluoride but are not limited to these materials.

Room temperature molten salt further referred to as ionic liquid may also be used for the electrolyte. Room temperature molten salt has low volatility and thus prevents volatilization of the electrolyte when heat is generated during the welding of the lid 3. The room temperature molten salt may be mixed with organic solvent to adjust the electrical conductivity at room temperatures or low temperatures. The room temperature molten salt is formed from the combination of cation and anion described below.

Appropriate room temperature molten salts used in an electric double layer capacitor include imidazolium cation, tetraalkylammonium cation, pyridinium cation, pyrazolium cation, pyrrolium cation, pyrrolinium cation, pyrrolidinium cation. Among these materials, 1-ethyl-3-methylimidazolium cation (EMI+) having a particularly high electrical conductivity is suitable for the capacitor electrolyte.

Imidazolium cations include dialkylimidazolium cation and trialkylimidazolium cation. Specifically, 1,3-dimethylimidazolium cation (DMI+), 1-ethyl-3-methylimidazolium cation (EMI+), 1-methyl-3-ethylimidazolium cation (MEI+), 1-methyl-3-butylimidazolium cation (MBI+), 1-butyl-3-methylimidazolium cation (BMI+), 1,2,3-trimethylimidazolium cation (TMI+), 1,2-dimethyl-3-ethylimidazolium cation (DMEI+), 1,2-dimethyl-3-propylimidazolium cation (DMPI+), 1-butyl-2,3-dimethylimidazolium cation (BDMI+), or the like may be used, but are not limited to these materials.

Pyridinium cations include N-ethylpyridinium cation (EP+), N-n-butylpyridinium cation, N-s-butylpyridinium cation, N-n-propylpyridinium cation, 1-ethyl-2-methylpyridinium cation, 1-n-hexyl-2-methylpyridinium cation, 1-n-butyl-4-methylpyridinium cation, 1-n-butyl-2,4-dimethylpyridinium cation, or the like may be used, but are not limited to these materials.

Pyrazolium cations include 1,2-dimethylpyrazolium cation, 1-ethyl-2-methylpyrazolium cation, 1-propyl-2-methylpyrazolium cation, 1-butyl-2-methylpyrazolium cation, or the like, or the like may be used, but are not limited to these materials.

Pyrrolium cations include 1,1-dimethylpyrrolium cation, 1-ethyl-1-methylpyrrolium cation, 1-methyl-1-propylpyrrolium cation, 1-butyl-1-methylpyrrolium cation, or the like may be used, but are not limited to these materials.

Pyrrolinium cations include 1,2-dimethylpyrrolinium cation, 1-ethyl-2-methylpyrrolinium cation, 1-propyl-2-methylpyrrolinium cation, 1-butyl-2-methylpyrrolinium cation, or the like may be used, but are not limited to these materials.

Pyrrolidinium cations includes 1,1-dimethylpyrrolidinium cation, 1-ethyl-1-methylpyrrolidinium cation, 1-methyl-1-propylpyrrolidinium cation, 1-butyl-1-methylpyrrolidinium cation, or the like may be used, but are not limited to these materials.

Anions include $AlCl_4^-$, $Al_2Cl_7^-$, $HF^-$, $NO_2^-$, $NO_3^-$, $BF_4^-$, $PF_6^-$, $AsF_6^-$, $SbF_6^-$, $NbF_6^-$, $TaF_6^-$, $CH_3CO_2^-$, $CF_3CO_2^-$, $C_3F_7CO_2^-$, $CH_3SO_3^-$, $CF_3SO_3^-$, $C_4F_9SO_3^-$, $N(CF_3SO_2)_2^-$, $N(C_2F_5SO_2)_2^-$, $C(CF_3SO_2)_3^-$, $N(CN)_2^-$.

As shown in FIGS. 2 and 3, a cathode outer terminal 5b1, which serves as common outer terminal corresponding to the cathode 7, and an anode outer terminal 5b2 corresponding to the anode 6 are formed on the outer bottom surface of the hollow container 1. The cathode outer terminal 5b1 and the anode outer terminal 5b2 each extend from the bottom surface of the hollow container 1 to the peripheral surface of the hollow container for connection to the corresponding electrode. The cathode outer terminal 5b1 and the anode outer terminal 5b2 are terminals connected to a print substrate (not shown) and are used when reflow soldering the electrochemical cell to the print substrate.

As shown in FIG. 3, two inner layer wires 5c are formed on the upper surface of the bottom portion 1a, that is, between the bottom portion 1a and the wall portion 1b. The two inner layer wires 5c are belt-shaped and extend along the outer edge of the bottom portion 1a for connection to the common cathode outer terminal 5b1.

Six spaced, belt-shaped inner terminals 5a are formed on the upper surface of the bottom portion 1a or the region corresponding to the hollow portion. The six inner terminals 5a are spaced apart from each other and arranged in the direction the inner layer wire 5c is formed. Each of the six inner terminals 5a is connected to either one of the inner layer wires 5c at between the bottom portion 1a and the wall portion 1b.

Each of the six inner terminals 5a is electrically insulated in the hollow portion of the hollow container 1. The six inner terminals 5a are commonly connected to the cathode outer terminal 5b1 at portions that do not come into contact with the electrolyte 10.

Accordingly, the six inner terminals 5a maintain the electrical connection between the interior of the hollow container 1 and the cathode outer terminal 5b1 unless all the inner terminals 5a break.

An increase in the number (quantity) of the inner terminal 5a lowers the possibility of adverse effects on the electrical function of the electrochemical cell. However, if the number (quantity) of inner terminal 5a excessively increases, the distance between the adjacent inner terminals 5a becomes too short. When the distance between the inner terminals 5a is too short, short-circuiting may occur between the inner terminals 5a due to displacement of the mask during pattern formation or other reasons. The number (quantity) of inner terminal 5a is preferably set at a pitch that is in accordance with the positional accuracy of the inner terminals 5a.

The inner terminals 5a, the cathode outer terminal 5b1, and the inner layer wires 5c are made of at least one selected from the group consisting of tungsten, molybdenum, nickel, gold, and a composite of these materials and may be formed by a single layer or a plurality of layers.

The inner terminal 5a, the cathode outer terminal 5b1, and the inner layer wires 5c are preferably formed in the following manner. Tungsten or molybdenum having a high melting point is pattern printed on the ceramic green sheet corresponding to the bottom portion 1a. On these ceramic green sheet, the ceramic green sheet corresponding to the wall portion 1b is superimposed and sintered together under a high temperature. This forms the inner terminals 5a and the cathode outer terminal 5b1, which is exposed, together with the inner layer wires 5c. Nickel plating and gold plating are then performed on the inner terminals 5a and the cathode outer terminal 5b1, which is exposed. This forms the cathode outer terminal 5b1, which has superior soldering characteristics and high electrical conductivity, and the inner terminals 5a, which have high electrical conductivity.

In the present embodiment, terminals are formed by the inner terminals 5a, the cathode outer terminal 5b1, and the inner layer wires 5c.

A protective film 9 is formed at the bottom surface of the hollow portion of the hollow container 1 between the inner terminals 5a and the cathode 7, as shown in FIG. 1. The protective film 9, which is a thin film having high resistance with respect to corrosion and which is provided with electrical conductivity, is formed only on the bottom surface of the hollow portion in the hollow container 1. The protective film 9 is laminated so as to entirely cover the inner terminals 5a in order to prevent contact between each inner terminal 5a and the electrolyte 10 and suppress corrosion of the inner terminals 5a resulting from charging and discharging. Material mainly based on aluminum or carbon and having high resistance to corrosion and low electrical resistance is used for the protective film 9. The protective film 9 made of aluminum is formed through methods such as deposition, sputtering, thermal spraying, paste application etc. using pure aluminum, Al—Cu alloy, Al—Mn alloy, Al—Mg alloy, or the like as defined by JIS. In particular, the protective film 9 made of aluminum formed through deposition or sputtering is preferable in that only a small number of pin holes are formed. When made of carbon such as graphite, the protective film 9 may be formed by applying and hardening an electrically conductive adhesive dispersed in thermosetting resin (e.g., phenol resin) at the inner bottom surface. When made of an electrically conductive adhesive, the protective film 9 may also be used as an adhesive layer between the hollow container 1 and the cathode 7. The protective film 9 may be a lamination to reduce pin holes.

The protective film 9 prevents the inner terminals 5a from coming into contact with the electrolyte 10. Accordingly, the inner terminals 5a maintain the electrical connection between the interior of the hollow container 1 and the cathode outer terminal 5b1 over a long period of time.

The method for manufacturing the electrochemical cell will now be described. The electrochemical cell is embodied in an electric double layer capacitor in which the length.times.width.times.thickness is 5 mm.times.3 mm.times.1 mm although the dimensions are not limited in such a manner.

A pattern in correspondence with the terminals is printed on an alumina ceramic green sheet corresponding to the bottom portion 1a. Particularly, a pattern corresponding to the six inner terminals 5a, cathode outer terminal 5b1, anode outer terminal 5b2, and two inner layer wires 5c is printed using tungsten paste. The pattern corresponding to the inner terminals 5a has a width of 0.3 mm and a pitch of 0.3 mm.

Next, a further alumina ceramic green sheet is punched out to form an alumina ceramic green sheet corresponding to the wall portion 1b. The two alumina ceramic green sheets corresponding to the bottom portion 1a and the wall portion 1b are laminated each other and then sintered together at approximately 1500.degree. C. This forms the hollow container 1. The two inner layer wires 5c are formed on an inner layer of the hollow container 1.

After forming the hollow container 1 and the inner layer wire 5c, the seal ring 2 made of Kovar is bonded to the open portion of the hollow container 1 with a brazing material 4 of Ag—Cu. Nickel plating and gold plating are then performed on the metal portion exposed from the surface of the hollow container 1. This forms a plating film on the surface of the seal ring 2 as a joint material used for welding. Further, the inner terminals 5a, the cathode outer terminal 5b1, and the anode outer terminal 5b2 made of tungsten-nickel-gold are formed. That is, the terminals of the electrochemical cell are formed.

After forming the hollow container 1 and the terminals, the bottom surface of the hollow portion in the hollow container 1 undergoes sputtering to form a pure aluminum film with a thickness of 5 .mu.m. Furthermore, an electrically conductive adhesive, in which graphite is dispersed in phenol resin, is applied to and hardened on the aluminum film. This forms the protective film 9, which includes the two layers of the aluminum film and the electrically conductive adhesive layer, with a thickness of 50 .mu.m.

Next, nickel plating is applied to a Kovar plate material having a thickness of 0.1 mm, and the plate material is then punched out to a size of 4.5 mm.times.2.5 mm in order to form the lid 3.

Commercially available activated carbon, graphite, and polytetrafluoroethylene are mixed at a ratio of 9:1:1 and rolled into an activated carbon sheet having a thickness of 200 .mu.m. The activated carbon sheet is punched out into a rectangular shape to form the cathode 7 and the anode 6.

After the cathode 7 and the anode 6 are formed, the cathode 7 and the protective film 9 are adhered together with an electrically conductive adhesive, and the lid 3 and the anode 6 are adhered together with an electrically conductive adhesive.

After respectively adhering the cathode 7 and the anode 6 to the protective film 9 and the lid 3, the separator 8, which is made of glass fiber, is arranged on the cathode 7. The electrolyte 10 in which 1 mol/L of $(C_2H_5)_4NB_4$ is dissolved in propylene carbonate (PC) is injected into the hollow container 1. The lid 3 is then arranged on the seal ring 2, and two points on the lid 3 are temporarily fastened to the seal ring 2 by performing spot resistance welding. Thereafter, the entire periphery of the lid 3 is welded to the seal ring 2 in a nitrogen atmosphere by means of a resistance seam welding machine having two roller electrodes.

This forms the electrochemical cell as the electric double layer capacitor. Each of the six inner terminals 5a is connected to the cathode outer terminal 5b1 at a portion that is not in contact with the electrolyte 10.

The operation of the electrochemical cell will now be described. The electrochemical cell is embodied in an electric double layer capacitor but is not limited in such a manner.

First, two types of electric double layer capacitors (comparative example 1 and comparative example 2) are formed as described below for comparison with the electric double layer capacitor (example).

Figure 4:
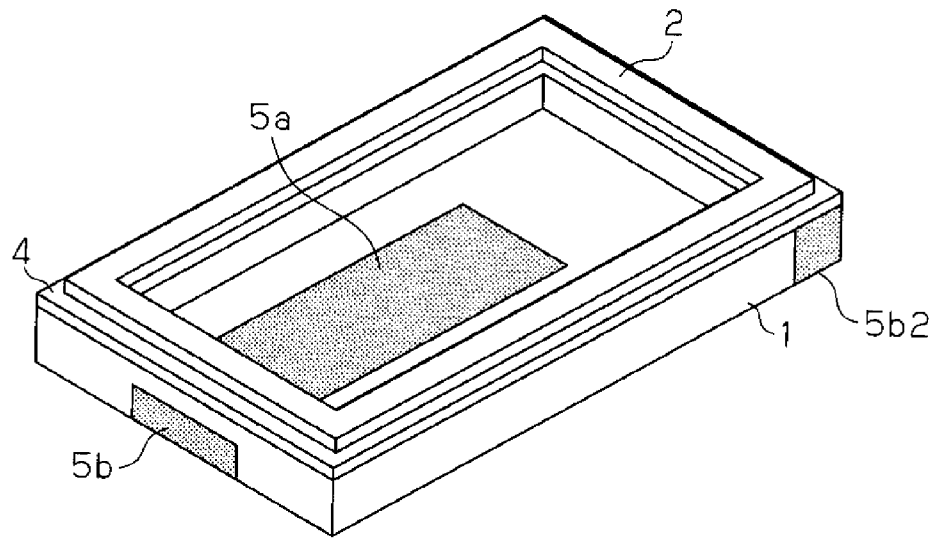
FIG. 4 is a perspective view showing a hollow container in a comparative example.

The electric double layer capacitor of comparative example 1 is obtained by forming only one inner terminal 5a on the inner bottom surface of the hollow container 1, as shown in FIG. 4. The protective film 9 is formed to have a thickness of 50 .mu.m which is the same as the above embodiment. The other parts are also identical to the above embodiment.

The electric double layer capacitor of comparative example 2 is obtained by forming only one inner terminal 5a on the inner bottom surface of the hollow container 1, as shown in FIG. 4. The protective film 9 has a thickness of 250 .mu.m, and the cathode 7 and the anode 6 have a thickness of 100 .mu.m. The other parts are identical to the above embodiment.

Each electric double layer capacitor (example, comparative example 1, comparative example 2) is conveyed through a reflow furnace having a peak temperature at 260.degree. C. to perform reflow soldering. The initial capacitance and the failure rate of each electric double layer capacitor are then measured.

The initial capacitance of each electric double layer capacitor is calculated from the time required for voltage between the cathode and the anode to become 2 V after applying 2.5 V between the cathode and the anode to perform charging and then performing discharging at a constant current of 5 .mu.A.

The failure rate of each electric double layer capacitor is calculated based on the capacitance measurement for a hundred electric double layer capacitors. That is, after continuously applying a voltage of 2.5 V between the cathode and the anode of each electric double layer capacitor arranged in a constant temperature bath of 70.degree. C. for 1000 hours, capacitance measurement is carried out under the same condition as when the initial capacitance was measured. Failure is determined if the capacitance is less than or equal to 10% of the initial capacitance, and the failure rate of each electric double layer capacitor is calculated accordingly. The test results are shown in table 1.

As shown in table 1, In comparative example 1 (one inner terminal $5a$ and protective film 9 of 50 .mu.m), 20% of samples had the capacitance of 10% or less of the initial capacitance after 1000 hours. The internal resistance of these samples was infinite, and the inner terminal $5a$ was found to be broken through observation with transmissive X-ray.

For comparative example 2 (one inner terminal $5a$ and protective film 9 of 250 .mu.m), 5% had the capacitance of 10% or less of the initial capacitance after 1000 hours. The failure rate was lower in comparative example 2 than in comparative example 1. However, the capacitance decreases due to the thinner cathode 7 and anode 6.

TABLE-US-00001 Table 1 Number of Initial Inner Terminal Capacitance (.mu.Ah) Failure Rate (%) Example 6 30 0 Comparative 1 30 20 Example 1 Comparative 1 15 5 Example 2

Among 100 samples of the example (six inner terminals $5a$, protective film 9 of 50 .mu.m), none had the capacitance of 10% or less of the initial capacitance after 1000 hours. The inner terminals $5a$ were observed with transmissive X-ray and found to have all six terminals unbroken or only one of the six terminals broken. However, there were no samples in which all six terminals were broken.

In this manner, even if the inner terminal $5a$ is made of a material that corrodes through contact with the electrolyte 10, the electric double layer capacitor has less failures and higher reliability. In the example and the comparative examples, the electrochemical cell is embodied in a electric double layer capacitor. However, the same effects are obtained when the electrochemical cell is embodied in a battery.

The present embodiment has the advantages described below.

(1) The terminals of the electrochemical cell include six spaced inner terminals $5a$ in the hollow portion for accommodating the electrolyte 10. The six inner terminals $5a$ are commonly connected to the inner layer wires $5c$ outside the hollow portion of the hollow container 1, that is, at a portion that is not in contact with the electrolyte 10. The inner layer wires $5c$ are commonly connected to the cathode outer terminal $5b1$ at the peripheral surface of the hollow container 1. Therefore, unless all the inner terminals $5a$ corrode and break, the electrical properties of the electrochemical cell are maintained even if the inner terminals $5a$ are corroded through contact with the electrolyte 10. As a result, the electrochemical cell has high reliability and high capacitance.

(2) The two inner layer wires $5c$ are connected to the cathode outer terminal $5b1$ at the peripheral surface of the hollow container 1. Therefore, the electrolyte 10 can be volatilized even if one of the inner layer wires $5c$ corrodes and the electrolyte 10 reaches the outer terminal $5b$. This surely prevents the outer terminal $5b$ from being corroded.

(3) The protective film 9 is formed on the six inner terminals $5a$ at the side that is in contact with the electrolyte 10. That is, the protective film 9 is laminated to cover all six inner terminals $5a$. The protective film 9 is formed by material mainly based on aluminum or carbon and having satisfactory resistance with respect to corrosion and low electrical resistance. The protective film 9 prevents the six inner terminals $5a$ from coming into contact with the electrolyte 10 and being corroded by charging or discharging. This further increases the reliability of the electrochemical cell.

Second Embodiment

Figure 5:
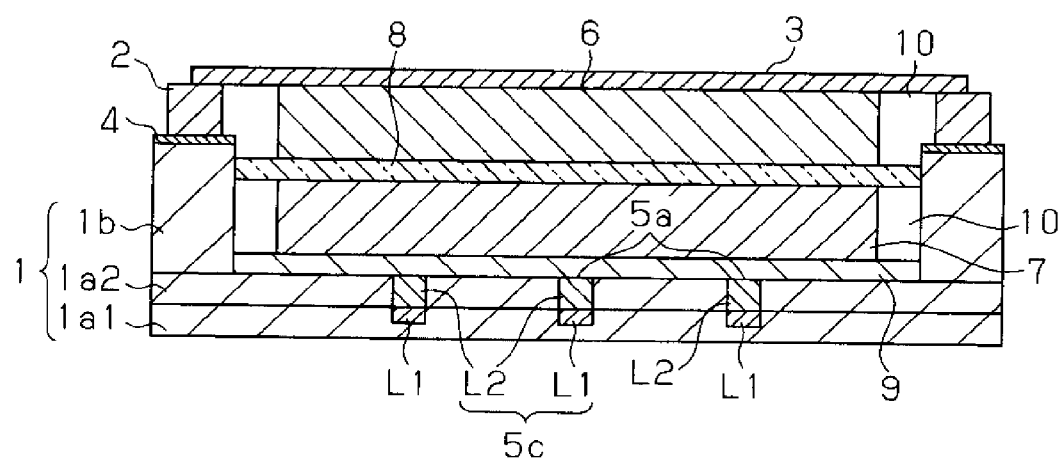
FIG. 5 is a cross-sectional view of an electrochemical cell according to a second embodiment of the present invention.

A second embodiment of the present invention will now be described according to FIGS. 5 to 8 focusing on the differences from the first embodiment. FIG. 5 is a cross-sectional view of the electrochemical cell of the second embodiment, FIG. 6 is a perspective view of a hollow container forming the electrochemical cell, FIG. 7 is a bottom view of the hollow container, and FIG. 8 is an exploded view of the electrochemical cell.

Figure 6:
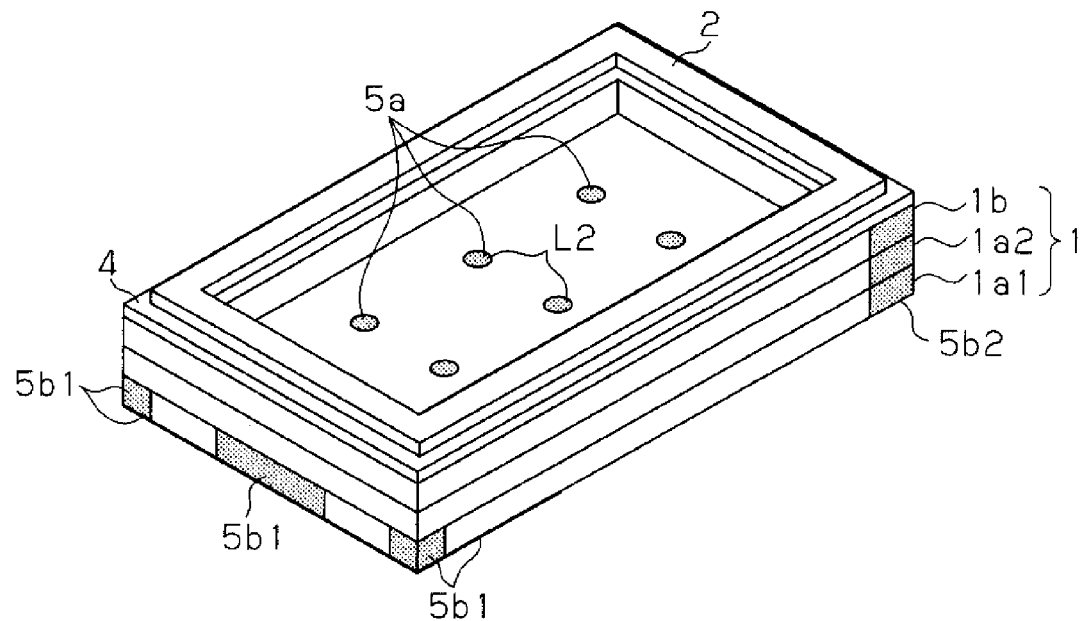
FIG. 6 is a perspective view showing a hollow container in the second embodiment of the present invention.

A hollow container 1 has a bottom portion formed by a first bottom portion $1a1$ and a second bottom portion $1a2$, which are rectangular plate-shaped, arranged from the bottom surface side, as shown in FIGS. 5 and 6.

Figure 7:
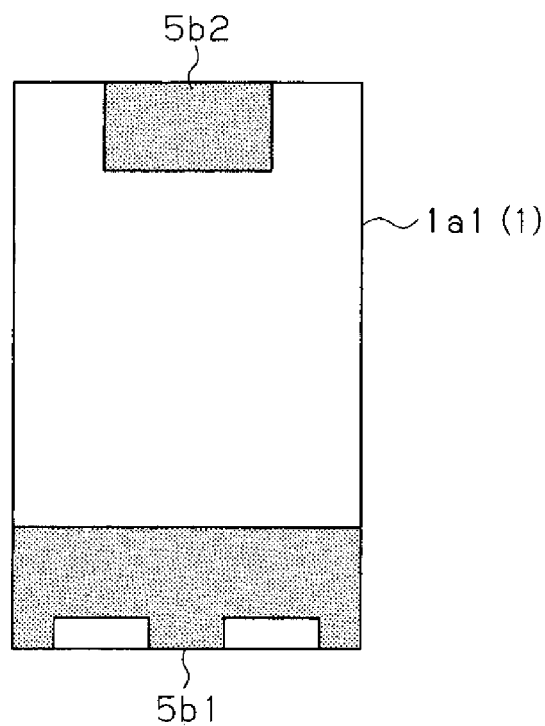
FIG. 7 is a bottom view showing the electrochemical cell in the second embodiment of the present invention.
Figure 8:
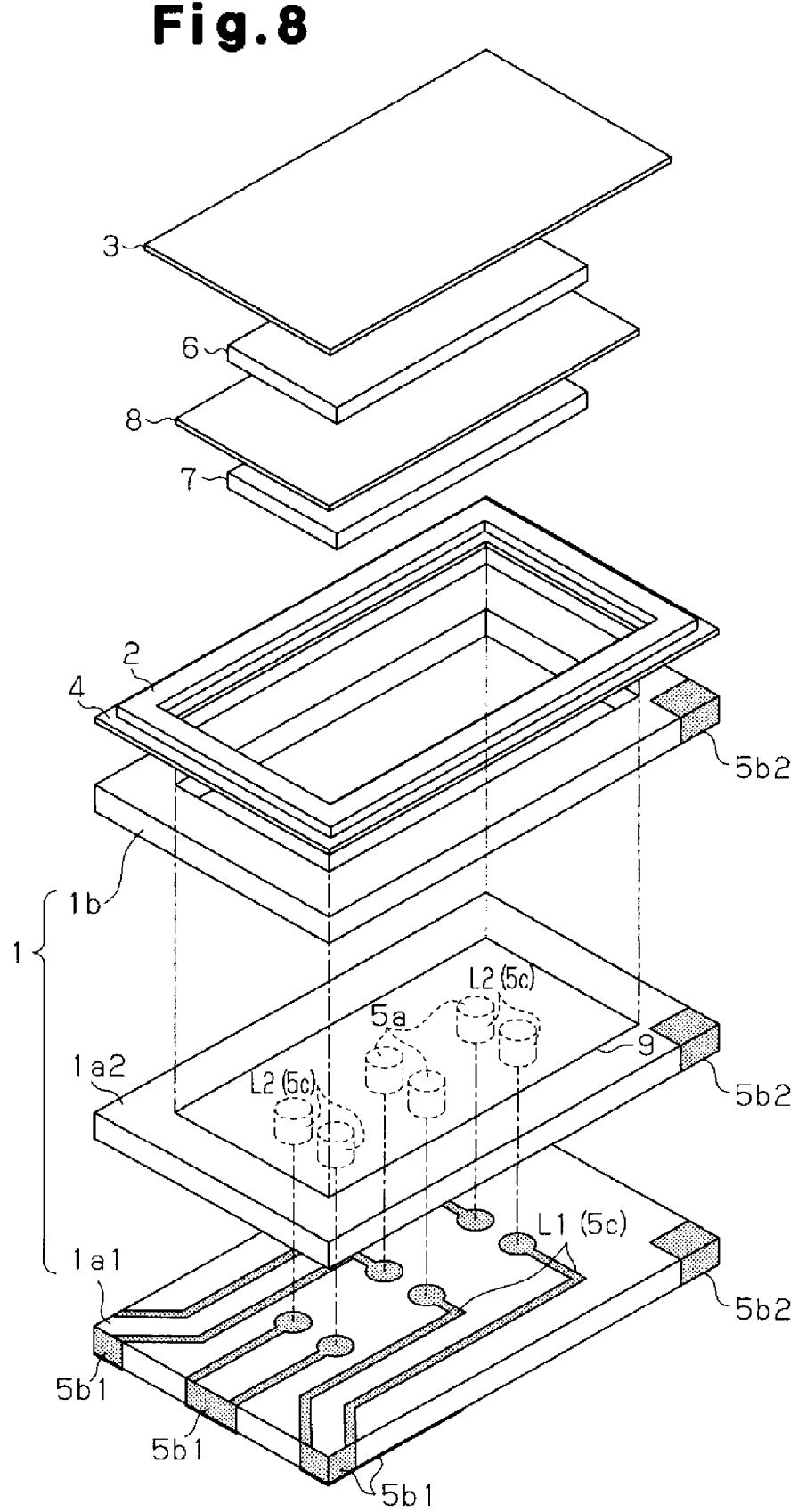
FIG. 8 is an exploded view showing the electrochemical cell in the second embodiment of the present invention.

As shown in FIGS. 7 and 8, a cathode outer terminal $5b1$, which serves as common outer terminals corresponding to a cathode 7, and an anode outer terminal $5b2$, which corresponds to an anode 6, are formed on the bottom surface of the first bottom portion $1a1$. The cathode outer terminal $5b1$ and the anode outer terminal $5b2$ are extend from the bottom surface of the hollow container 1 to the peripheral surface of the hollow container 1 for connection to the corresponding electrode in the same manner as in the first embodiment.

Six interlayer wires L1 are formed between the first bottom portion $1a1$ and the second bottom portion $1a2$ as shown in FIG. 8. The six interlayer wires L1 are commonly connected to the cathode outer terminal $5b1$ at the outer surface of the hollow container 1 and extends to a central part of the upper surface of the first bottom portion $1a1$. Each interlayer wire L1 is made of at least one selected from the group consisting of tungsten, molybdenum, nickel, gold, and a composite of these materials, and is formed by a single layer or a plurality of layers.

Six via wires L2 extend through the second bottom portion $1a2$ between the first bottom portion $1a1$ and the hollow portion (accommodation compartment). Each of the six via wires L2 is formed near the center of the second bottom portion $1a2$ and connected to the corresponding interlayer wire L1. Only the upper end surface face of each of the six via wires L2 is exposed from the bottom surface of the hollow portion.

In the second embodiment, the upper end surface of each via wire L2 forms an inner terminal $5a$. The via wires L2 and the interlayer wires L1 form the inner layer wire $5c$.

Each via wire L2 is made of at least one selected from the group consisting of tungsten, molybdenum, nickel, gold, and a composite of these materials and is formed by a single layer or a plurality of layers. Accordingly, the hollow container 1 and the via wires L2 are sintered together and formed. Alternatively, paste mixed with carbon and resin may be used for the via wires L2. In such a case, after the hollow container 1 is sintered, each via hole may be filled with paste to improve the processing accuracy. Furthermore, corrosion that occurs when contacting the electrolyte 10 is further suppressed.

In the same manner as the first embodiment, an increase in the number (quantity) of the inner terminals $5a$, which are formed by the via wires L2, maintain the electrical function of the electrochemical cell over a longer period of time. Furthermore, for the inner terminals 5a formed by the via wires L2, the area exposed from the bottom surface of the hollow portion is reduced compared to the inner terminal 5a of the first embodiment. Thus, the inner terminals 5a formed by the via wires L2 prevents short circuits between the inner terminals 5a that would be caused by displacement of a mask used for pattern formation and reduces the frequency of contact with the electrolyte 10.

The protective film 9 is formed on the bottom surface of the hollow portion of the hollow container 1 between via wires L2 (inner terminals 5a) and the cathode 7 in the same manner as in the first embodiment.

The protective film 9 is formed by applying a mask to the side surface of the hollow portion of the hollow container 1 and performing sputtering, thermal spraying, paste application, or the like in the hollow portion. The protective film 9 formed through such a method has a rougher film quality (film quality including many pin holes) at the edge of the bottom surface of the hollow portion than near the center of the hollow portion. Since the inner terminals 5a of the present embodiment are formed near the center of the second bottom portion 1a2, the inner terminals 5a are not protected by the protective film 9 where the film quality is rough and are protected by the protective film 9 where the quality is better.

In addition to advantages (1) to (3) of the first embodiment, the present embodiment has the following advantages.

(4) The terminals of the electrochemical cell have six spaced via wires L2 at the bottom surface of the hollow portion, which accommodates the electrolyte 10. Only the upper end face (inner terminal 5a) of each of the six via wires L2 is exposed from the bottom surface of the hollow portion. The via wires L2 are commonly connected to the cathode 7. Therefore, the inner terminals 5a formed by the via wires L2 reduce the frequency of contact with the electrolyte 10 since the exposed area is reduced. This further increases the reliability of the electrochemical cell.

(5) Furthermore, when forming the inner terminals 5a with the same total area, the number of inner terminals 5a may be increased by reducing the area of each inner terminal 5a. This further increases the reliability of the electrochemical cell.

(6) Each of the six via wires L2 is formed near the center of the second bottom portion 1a2. Therefore, the inner terminals 5a are all protected by the protective film 9 where the quality is satisfactory since the inner terminals 5a are formed near the center of the second bottom portion 1a2.

The invention claimed is:

1. An electrochemical cell comprising:
a first electrode, a second electrode, and an electrolyte;
a rectangular box-shaped ceramic container defining an accommodation compartment for accommodating the first electrode, the second electrode, and the electrolyte, the second electrode being located above the first electrode in the rectangular box-shaped ceramic container
a first outer terminal externally connected to a plurality of inner terminals electrically and commonly connected to the first electrode; and
a second outer terminal electrically connected to the second electrode,
wherein the rectangular box-shaped ceramic container includes a rectangular plate-shaped bottom portion and a rectangular frame-shaped wall portion formed along a periphery of the bottom portion,
wherein the second outer terminal includes a second outer terminal portion formed on an outer bottom surface of the rectangular box-shaped ceramic container,
wherein the second outer terminal further includes a first portion extending on an outer side surface of the bottom portion and a second portion extending on an outer side surface of the wall portion, and a third portion extending between the bottom portion and the wall portion in such a way that the third portion is directly in contact with the first portion and the second portion, and
wherein the first and second portions of the second outer terminal electrically connect the second electrode and the second outer terminal portion.

2. The electrochemical cell according to claim 1, further comprising a protective film covering the inner terminals.

3. The electrochemical cell according to claim 1, wherein the inner terminals are made of at least one selected from the group consisting of tungsten, molybdenum, nickel, gold, and a composite of these materials and are formed by a single layer or a plurality of layers.

4. The electrochemical cell according to claim 1, wherein the rectangular box-shaped ceramic container is made of ceramic containing at least one selected from the group consisting of alumina, silicon nitride, zirconium, silicon carbide, aluminum nitride, mullite, and a composite of these materials.

5. An electrochemical cell comprising:
a first electrode, a second electrode, and an electrolyte;
a rectangular box-shaped ceramic container defining an accommodation compartment for accommodating the first electrode, the second electrode, and the electrolyte, the second electrode being located above the first electrode in the rectangular box-shaped ceramic container;
a first outer terminal externally connected to a plurality of inner terminals electrically and commonly connected to the first electrode; and
a second outer terminal electrically connected to the second electrode,
wherein the rectangular box-shaped ceramic container includes a bottom portion and a frame-shaped wall portion formed along a periphery of the bottom portion and extending therefrom, the bottom portion includes a rectangular plate-shaped first bottom portion and a rectangular plate-shaped second bottom portion formed on the first bottom portion,
wherein the second outer terminal includes a second outer terminal portion formed on an outer bottom surface of the rectangular box-shaped ceramic container,
wherein the second outer terminal further includes a first portion extending on an outer side surface of the first bottom portion, a second portion extending on an outer side surface of the second bottom portion, and a third portion extending on an outer side surface of the frame-shaped wall portion, a fourth portion extending between the first bottom portion and the second bottom portion in such a way that the fourth portion is directly in contact with the first portion and the second portion, and a fifth portion extending between the second bottom portion and the wall portion in such a way that the fifth portion is directly in contact with the second portion and the third portion, and
wherein the first, second, and third portions of the second outer terminal electrically connect the second electrode and the second outer terminal portion.

6. The electrochemical cell according to claim 5, further comprising via wires provided in and passing entirely through the second bottom portion,
   wherein each via wire has an end surface exposed from an inner bottom surface of the rectangular box-shaped ceramic container, and the end surfaces of the via wires function as the inner terminals.

7. The electrochemical cell according to claim 5, further comprising a protective film covering the inner terminals.

8. The electrochemical cell according to claim 5, wherein the inner terminals are made of at least one selected from the group consisting of tungsten, molybdenum, nickel, gold, and a composite of these materials and are formed by a single layer or a plurality of layers.

9. The electrochemical cell according to claim 5, wherein the rectangular box-shaped ceramic container is made of ceramic containing at least one selected from the group consisting of alumina, silicon nitride, zirconium, silicon carbide, aluminum nitride, mullite, and a composite of these materials.

* * * * *